Jan. 8, 1935.  L. GOLDHAMMER  1,987,254

ROLL FILM CAMERA

Filed June 9, 1933

Inventor:
Leo Goldhammer,
By Attorney
Philip S. Hopkins.

Patented Jan. 8, 1935

1,987,254

UNITED STATES PATENT OFFICE 1,987,254

ROLL FILM CAMERA

Leo Goldhammer, Munich, Germany, assignor to Agfa Ansco Corporation, Binghamton, N. Y., a corporation of New York Application June 9, 1933, Serial No. 675,127
In Germany June 29, 1932

4 Claims. (Cl. 95—32)

My present invention relates to a roll film camera.

Figure 1:
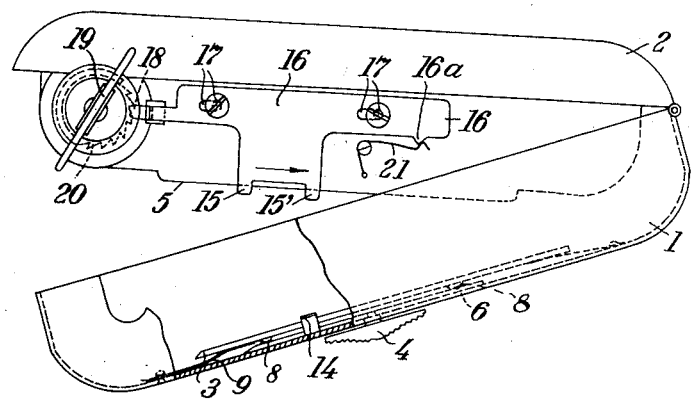
Figure 2:
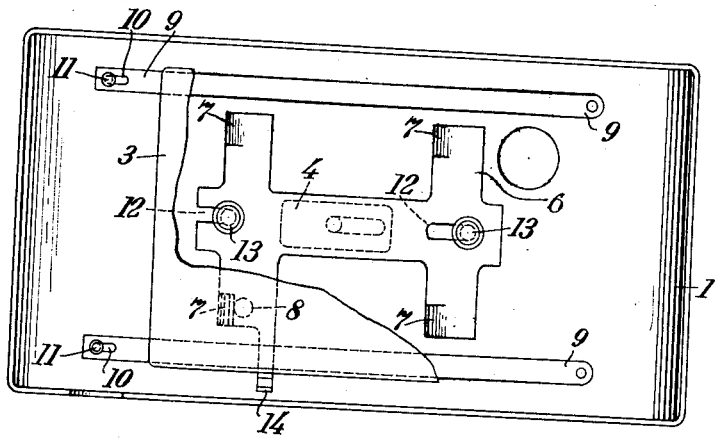

One of its objects is to provide a device which causes the film key to be locked as long as the pressure frame presses the film in the exposure window. Further objects will be seen from the detailed specification following hereafter. Reference is made to the accompanying drawing in which Fig. 1 is a side elevation of a camera according to this invention with the casing half-open, Fig. 2 is a plan view on the back part of the casing from the inner side showing the pressure plate.

According to this invention the winding of film is prevented as long as the pressure plate presses the film in the exposure window by means of a locking device which is interconnected with the pressure plate, so that on removal of the pressure plate the locking device is released. By these means the film is preserved from being scratched during the winding operation. When mounting the pressure plate on the removable back part of the camera, there may be provided a slide for bringing the pressure plate in its operative position, said slide coupling with another slide provided in the front part of the camera, so that the film key is locked on folding the camera.

The slide for moving the pressure plate may be provided with a lug which effects coupling on folding the camera, while the slide for locking the camera may be provided with a latching tooth which may engage a ratchet wheel connected with the film key.

The back part 1 of the camera casing is hinged in known manner to the front part 2. Inside the back part 1 there is provided the pressure plate 3, which presses the film against the exposure window frame 5 or a glass pane disposed thereon and which may be removed therefrom by means of a slide 4 which is controlled from outside. The device for operating the pressure plate 3 consists, for instance, of a double T-formed piece 6 (see Fig. 2) the free ends of which have wedge-formed surfaces 7. These wedge-formed surfaces 7 co-operate with projections 8, provided on the pressure plate 3, in such a manner that when the double T-piece 6 is moved by the slide 4 the wedge-like surfaces glide along the projections 8, thus lifting the pressure plate 3 from the back wall 1 and pressing it against the film reposing on the exposure window frame 5. The pressure plate 3 has resilient lugs 9, by means of which it is fastened to the back part 1 of the casing, for instance, by riveting. To compensate for the movement of the pressure frame the lugs 9 on the one side are provided with slots 10 which enable the lugs 9 to glide along the stationary rivets 11. The double T-piece, too, is provided with slots 12 by means of which it is movably guided along screw bolts 13.

According to this invention the double T-piece 6 has a bent portion 14, which after folding the camera lies between the stops 15 and 15' of the slide 16 fixed to the main body 2. The slide 16 is slidably mounted on the front part of the camera casing by a pin-and-slot connection 17 and at its tapered end bears a pawl 18, which engages with the ratchet wheel 20 connected to the key 19 if portion 14 has guided the slide 16 to the position represented in Fig. 1 by means of the extensions 15. If the pressure plate 3 is withdrawn from the film by means of the slide 4, the portion 14 moves the slide 16 in the direction of the arrow by means of the extension 15', so that the pawl 18 is removed from the ratchet wheel 20 and the key 19 is released. The slide is secured in its position in or out of engagement with the ratchet wheel by means of a spring 21 attached to the side wall of the camera. The slide 16 can be moved only after having counteracted the action of the spring against the nose 16a.

What I claim is:

1. In a roll film camera, in combination, a casing consisting of a front part and a back part, a pressure plate mounted in the back part of said casing, film winding means located in the front part of said casing, an aperture gate mounted in the front part of said casing, means for pressing said pressure plate against said aperture gate, and means arranged in said front part for locking said film winding means as long as the pressure plate presses against said aperture gate.

2. In a roll film camera, in combination, a casing consisting of a front part and a back part, an aperture gate mounted in said front part of said casing, two bolts mounted on the back part of said casing and a slot provided in the back part of said casing, a double T-formed piece having its ends shaped in form of wedges and being provided with two slots engaging said bolts, a knob and a pin securing said knob on said double T-formed piece, said pin engaging said slot in said back part, so that said double T-formed piece can be moved by said knob, a pressure plate, four lugs provided on said pressure plate, two rivets mounted on said back part of said casing, two of said lugs fastening said pressure plate to said back part, the other two lugs being provided with slots and lugging by means of said slots said two rivets so that said pressure plate resiliently covers said double T-formed piece, four projections fixed on said double T-formed piece engaging said wedge formed parts of said double T-formed piece so that on movement of said knob said pressure plate is pressed against said aperture gate or removed from it, film winding means located in said front part of said casing and means arranged in said front part for locking said film winding means as long as the pressure plate presses against said aperture gate.

3. In a roll film camera, in combination, a casing consisting of a front part and a back part, an aperture gate mounted in said front part of said casing, two bolts mounted on the back part of said casing and a slot provided in the back part of said casing, a double T-formed piece having its ends shaped in form of wedges and being provided with two slots engaging said bolts, a knob and a pin securing said knob on said double T-formed piece, said pin engaging said slot in said back part, so that said double T-formed piece can be moved by said knob, a pressure plate, four lugs provided on said pressure plate, two rivets mounted on said back part of said casing, two of said lugs fastening said pressure plate to said back part, the other two lugs being provided with slots and lugging by means of said slots said two rivets so that said pressure plate resiliently covers said double T-formed piece, four projections fixed on said double T-formed piece engaging said wedge formed parts of said double T-formed piece, film winding means located in said front part of said casing, a ratchet wheel fastly connected to and movable with said film winding means a slide movably mounted on said front part by means of a pin and slot connection, a latching tooth and two stops provided on said slide, one of said ends of said double T-formed piece forming a bent portion which engages said slide between said stops so that on movement of said knob said pressure plate is pressed against said aperture gate and removed from it and simultaneously said latching tooth comes in and out of engagement with said ratchet wheel.

4. In a roll film camera, in combination, a casing consisting of a front part and a back part, an aperture gate mounted in said front part of said casing, two bolts mounted on the back part of said casing and a slot provided in the back part of said casing, a double T-formed piece having its ends shaped in form of wedges and being provided with two slots engaging said bolts, a knob and a pin securing said knob on said double T-formed piece, said pin engaging said slot in said back part, so that said double T-formed piece can be moved by said knob, a pressure plate, four lugs provided on said pressure plate two rivets mounted on said back part of said casing, two of said lugs fastening said pressure plate to said back part, the other two lugs being provided with slots and lugging by means of said slots said two rivets so that said pressure plate resiliently covers said double T-formed piece, four projections fixed on said double T-formed piece engaging said wedge formed parts of said double T-formed piece, winding means located in said front part of said casing, a ratchet wheel fastly connected to and movable with said film winding means, a slide movably mounted on said front part by means of a pin and slot connection, a latching tooth and two stops provided on said slide, one of said ends of said double T-formed piece forming a bent portion which engages said slide between said stops so that on movement of said knob said pressure plate is pressed against said aperture gate and removed from it and simultaneously said latching tooth comes in and out of engagement with said ratchet wheel, a nose provided on said slide and a spring mounted on said front part, said nose and said spring cooperating so that said latching tooth of said slide is kept in or out of engagement with said ratchet wheel on opening the camera.

LEO GOLDHAMMER.